July 30, 1929.	L. POETON	1,722,591

OPHTHALMIC MOUNTING

Filed Dec. 17, 1923

INVENTOR
Lawrence Poeton.
BY
Harry H. Styll
ATTORNEY

Patented July 30, 1929.

1,722,591

UNITED STATES PATENT OFFICE.

LAWRENCE POETON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed December 17, 1923. Serial No. 681,248.

The present invention relates to an improved form of ophthalmic mounting and has particular reference to a combined zyl and metal frame.

An important object of the invention is to provide a combined zyl and metal frame of this nature wherein the lens may be placed into and removed from its position without the necessity of opening the endpiece or temple joint.

Another very important object of this invention is to provide a mounting of this nature wherein the lens may be slipped into place and held in such a manner that the lens will have a slight yielding tendency in case the lens is accidentally struck, thus preventing fracture of the lens as in the case where the lens is rigidly held in place.

Another very important object of the invention is to provide a mounting of this nature wherein new lenses may be substituted and placed in position with a minimum amount of effort.

Another important object of the invention is to provide a device of this nature that will be strong, durable, very simple and inexpensive in construction and one that is especially well adapted to the uses for which it is designed.

Other objects and advantages of the invention will become apparent during the course of the following description.

Figure 1:
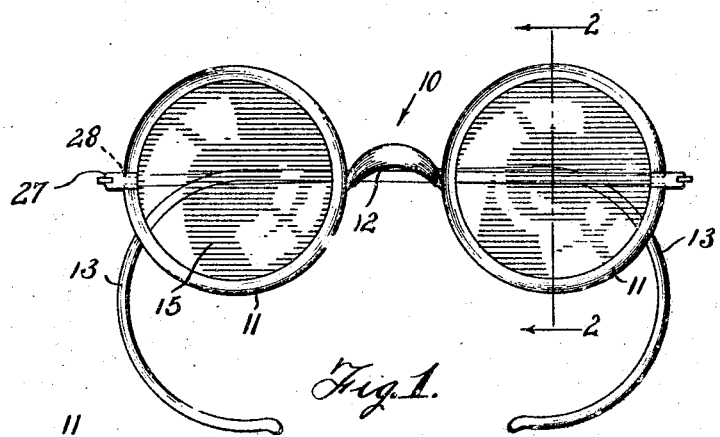
Figure 2:
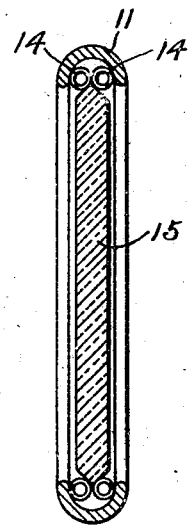
Figure 3:
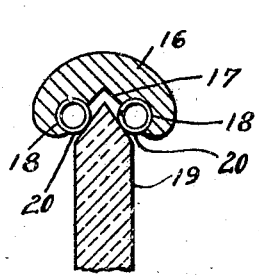
Figure 4:
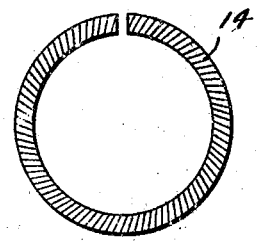
Figure 5:
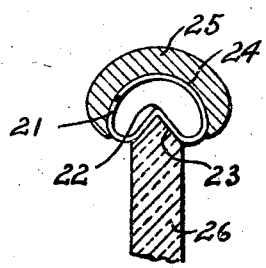
Figure 6:
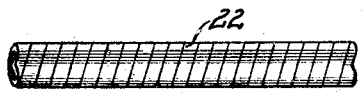

In the drawings, wherein like numerals are employed to designate like parts throughout the same, Figure 1 is a front elevation of an ophthalmic mounting made in accordance with my invention, Figure 2 is a section taken on line 2—2 in Figure 1, Figure 3 is an enlarged cross sectional detail of the zyl rim used in accordance with a modification of my invention, Figure 4 is a transverse section of one of the metallic members used, Figure 5 is a transverse section of a modified form of mounting, and Figure 6 is a fragmentary detail of a portion of the metallic member used in accordance with Figure 5.

In the drawings, wherein for the purposes of illustration is shown the preferred embodiment of my invention, the numeral 10 designates an ophthalmic mounting in its entirety and comprises the eye-pieces 11, bridge 12 and temples 13. The eye-pieces 11 may be constructed as shown in Figure 2 and are sufficiently broad to accommodate wire coil portions 14, which coils are disposed one on each side of the lenses 15. The eye-portion 11 is formed preferably of a cellulose composition material which may be spread apart when it is desired by making the same plastic by immersion in hot water, but this is rather tedious and expensive, so I have provided the coils 14 which will normally hold the lens 15 in a rigid position, but which will allow a slight movement thereof in the event that the lens is accidentally struck. Furthermore, when it is desired to move the lens one of the springs 14 may be slightly depressed, as will readily be understood, thus allowing the lens to slip out from under the member 11.

In Figure 3 is shown a slight modification of the eye member 16 in which instance a centrally disposed preferably V shaped groove 17 is provided on the under surface which groove communicates with the substantial circular recesses 18. The V shaped groove 17 is adapted to receive the lens 19 while the coils 20 are received within the recesses 18.

In Figure 5 of the drawings a coiled spring eye-member 21 which is depressed as at 22 to form a seat 23, is received within the groove 24 of the zyl member 25. The indented portion 22 thus forms a very satisfactory seat for the lens 26, at the same time allowing of the easy removal of the lens when it is so desired.

In view of the fact that the member 11 does not have to be enlarged in order to remove or replace the lens 15, a solid end-piece 27 is used, which is provided with suitable sockets 28 adapted to receive the ends of the zyl member 11. This is a decided advantage over many forms of frames now in use.

It will thus be seen that I have devised an improved mounting formed from a combination of zyl and metal wherein a lens may be readily placed in position or removed therefrom without touching the zyl portion as has heretofore been done.

It is to be understood that the form of my invention herewith shown and described is to be taken as the preferred embodiment of the same and that various changes in the shape, size and arrangement of parts may be resorted to without departing from the spirit of my invention or the scope of the subjoined claims.

Having thus described my invention, I claim:

1. In a device of the character described, an annular member having an internal groove, resilient means in the groove having a reentrant recess adapted to receive the edge of a disc-like member between the sides of the recess and a disc-like member projecting into the reentrant portion of the resilient means.

2. In a device of the character described, an annular member having an internal groove, coil spring resilient means in the groove having a reentrant recess between the coils adapted to receive the edge of a disc-like member between the coils and a disc-like member projecting into the reentrant portion between the coils of the resilient means.

3. In a device of the character described, an annular member having an internal groove, resilient means in the groove having a reentrant recess adapted to receive the edge of a disc-like member between the sides of the reentrant recess, and a disc-like member having a double bevelled edge projecting into the reentrant portion of the resilient means.

4. In a device of the character described, an annular member having an internal groove, resilient means in the groove having a reentrant V-shaped recess adapted to receive the edge of a disc-like member between the sides of the recess and a disc-like member having a V-shaped peripheral edge projecting into the reentrant recess of the resilient means.

LAWRENCE POETON.